United States Patent
Laurence et al.

(10) Patent No.: US 10,101,475 B2
(45) Date of Patent: Oct. 16, 2018

(54) DEAD PIXEL COMPENSATION IN POSITRON EMISSION TOMOGRAPHY (PET)

(71) Applicant: KONINKLIJKE PHILIPS N.V., Eindhoven (NL)

(72) Inventors: Thomas Leroy Laurence, North Royalton, OH (US); Sharon Xiaorong Wang, Highland Heights, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 76 days.

(21) Appl. No.: 15/126,606

(22) PCT Filed: Mar. 17, 2015

(86) PCT No.: PCT/IB2015/051925
§ 371 (c)(1),
(2) Date: Sep. 16, 2016

(87) PCT Pub. No.: WO2015/145301
PCT Pub. Date: Oct. 1, 2015

(65) Prior Publication Data
US 2017/0074995 A1    Mar. 16, 2017

Related U.S. Application Data

(60) Provisional application No. 61/971,769, filed on Mar. 28, 2014.

(51) Int. Cl.
*G01T 1/20* (2006.01)
*G01T 1/29* (2006.01)
*G01T 1/164* (2006.01)
*G01T 7/00* (2006.01)

(52) U.S. Cl.
CPC .......... *G01T 1/2985* (2013.01); *G01T 1/1647* (2013.01); *G01T 1/2018* (2013.01); *G01T 7/00* (2013.01)

(58) Field of Classification Search
CPC .................................................. G01T 1/2985
See application file for complete search history.

(56) References Cited

U.S. PATENT DOCUMENTS

| | | |
|---|---|---|
| 4,789,933 A | 12/1988 | Chen |
| 6,661,456 B1 | 12/2003 | Aufrichtig |
| 6,694,172 B1 | 2/2004 | Gagnon |
| 2005/0063513 A1 | 3/2005 | Hsieh |

(Continued)

FOREIGN PATENT DOCUMENTS

WO    03/001243    1/2003

OTHER PUBLICATIONS

Rahmim et al., "Motion compensation in histogram-mode and list-mode EM reconstructions: beyond the event-driven approach," 2004, IEEE Transactions on Nuclear Science, vol. 51, No. 5, pp. 2588-2596.*

*Primary Examiner* — Kiho Kim

(57) ABSTRACT

A system (10) and a method (100) compensate for one or more dead pixels in positron emission tomography (PET) imaging. A pixel compensation processor receives PET data describing a target volume of a subject. The PET data is missing data for one or more dead pixels. The pixel compensation estimates PET data for the dead pixels from the received PET data.

17 Claims, 3 Drawing Sheets

(56) References Cited

U.S. PATENT DOCUMENTS

| | | |
|---|---|---|
| 2006/0097175 A1 | 5/2006 | Ganin |
| 2006/0289776 A1 | 12/2006 | Gagnon |
| 2007/0147589 A1 | 6/2007 | Thielemans |
| 2008/0226032 A1 | 9/2008 | Li |
| 2010/0139696 A1 | 8/2010 | Blevis |
| 2010/0193697 A1 | 8/2010 | Bal |
| 2010/0294944 A1* | 11/2010 | Furumiya ............. G01T 1/1647 250/370.1 |
| 2011/0110486 A1 | 5/2011 | Bouhnik |
| 2011/0150181 A1* | 6/2011 | Cook .................... G01T 1/1648 378/86 |
| 2011/0235940 A1 | 9/2011 | Pavkovich |
| 2011/0249005 A1 | 10/2011 | Hautvast |
| 2012/0068076 A1 | 3/2012 | Daghighian |
| 2012/0141001 A1 | 6/2012 | Zhang |
| 2012/0228486 A1 | 9/2012 | Herrmann |

* cited by examiner

DEAD PIXEL COMPENSATION IN POSITRON EMISSION TOMOGRAPHY (PET)

CROSS REFERENCE TO RELATED APPLICATIONS

This application is the U.S. National Phase application under 35 U.S.C. § 371 of International Application No. PCT/IB2015/051925, filed Mar. 17, 2015, published as WO 2015/145301 on Oct. 1, 2015, which claims the benefit of U.S. Provisional Patent Application No. 61/971,769 filed Mar. 28, 2014. These applications are hereby incorporated by reference herein.

The present application relates generally to positron emission tomography (PET). It finds particular application in conjunction with compensating for dead pixels, and will be described with particular reference thereto. However, it is to be understood that it also finds application in other usage scenarios, and is not necessarily limited to the aforementioned application.

In the past, PET systems have typically employed photomultiplier tubes (PMTs), such as 1.5 inch PMTs, for light detection. A typical PMT based PET system contains anywhere from about 12,000 to 33,000 individual scintillators, but uses only 200 to 800 PMTs. As such, a typical PMT based PET system is fairly intolerant of a non-functioning PMT. Because of the size of PMTs, a non-functioning PMT renders a large part of the detector inoperable. Further, Anger logic does not support calculating the location of scintillation events that occur in an inoperable part of the detector.

More recently, PET systems have been transitioning to SiPMs, such as 3×3 or 4×4 millimeter (mm) SiPMs, for light detection. In SiPM based PET system, there is a high probability that some of the SiPMs may not function properly. In contrast with PMT based PET system, the SiPM channel count of SiPM based PET system approaches the scintillator count. Since the impacted area of a non-functioning SiPM is fairly small, a SiPM based PET system can tolerate non-functioning SiPMs. This applies to a one-to-one coupling of scintillators to SiPMs, and a many-to-one coupling of scintillators to SiPMs where micro-Anger calculations are performed to determine event positions.

While SiPM based PET systems can tolerate non-functioning SiPMs, the quality of reconstructed images is degraded. Non-functioning SiPMs result in dead pixels. A pixel is the smallest area to which a scintillation event can be localized. A dead pixel is a pixel missing valid data. Dead pixels may also arise due to problems in one or more of scintillator performance, optical coupling between SiPMs and scintillators, and processing electronics. Dead pixels result in imaging artifacts during reconstruction. Artifacts during reconstruction are more pronounced for higher statistic scans with a fairly uniform activity in the scanned target volume.

With reference to FIG. 1, a sinogram generated using a PET scanner with three dead pixels is provided. The sinogram describes spatial information and does not contain time-of-flight (TOF) information. The PET scanner includes a one-to-one coupling between scintillators and SiPMs, and the smallest area to which a scintillation event can be localized is a SiPM/scintillator pair. As can seen, dead pixels cause dark lines of missing data, emphasized by the arrows. The gap between the detectors generates the periodic mesh pattern.

The present application provides a new and improved system and method which overcome these problems and others.

In accordance with one aspect, a system for compensating for one or more dead pixels in positron emission tomography (PET) imaging is provided. The system includes a pixel compensation processor which receives PET data describing a target volume of a subject. The PET data is missing data for one or more dead pixels. The pixel compensation processor further estimates PET data for the dead pixels from the received PET data.

In accordance with another aspect, a method for compensating for one or more dead pixels in positron emission tomography (PET) imaging is provided. PET data describing a target volume of a subject is received. The PET data is missing data for one or more dead pixel. PET data for the dead pixels is estimated from the received PET data.

In accordance with another aspect, a system for compensating for one or more dead pixels in positron emission tomography (PET) imaging is provided. The system includes a plurality of silicon photomultipliers (SiPMs) which generate PET data describing a target volume of a subject. The system further includes a pixel compensation processor which receives PET data describing a target volume of a subject from the SiPMs. The PET data is missing data for a dead pixel associated with a non-functioning SiPM. The pixel compensation processor further generates PET data for the dead pixel from the received PET data.

One advantage resides in reduced imaging artifacts.

Another advantage resides in increased image quality.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

PET scanners employing silicon photomultipliers (SiPMs) for light detection have a high likelihood of dead pixels. A pixel is the smallest area to which a scintillation event can be localized. A dead pixel is a pixel missing valid data. Dead pixels may arise due to problems in one or more of scintillator performance, optical coupling between SiPMs and scintillators, SiPMs, and processing electronics. The present application describes an approach for compensating for dead pixels by filling in the missing data with data from other pixels. This eliminates missing lines-of-response (LOR) and yields an image better representing the scanned target volume.

A number of approaches are described hereafter for filling the missing data of dead pixels. In one instance, a first order approximation is employed. According to this approach, the event data of pixels neighboring a dead pixel is duplicated and the duplicate data is augmented by replacing the locations of the neighboring pixels with the location of the dead pixel. In another instance, sinogram space interpolation is employed. According to this approach, each position in the sinogram space associated with a dead pixel is interpolated from neighboring positions.

Figure 2:
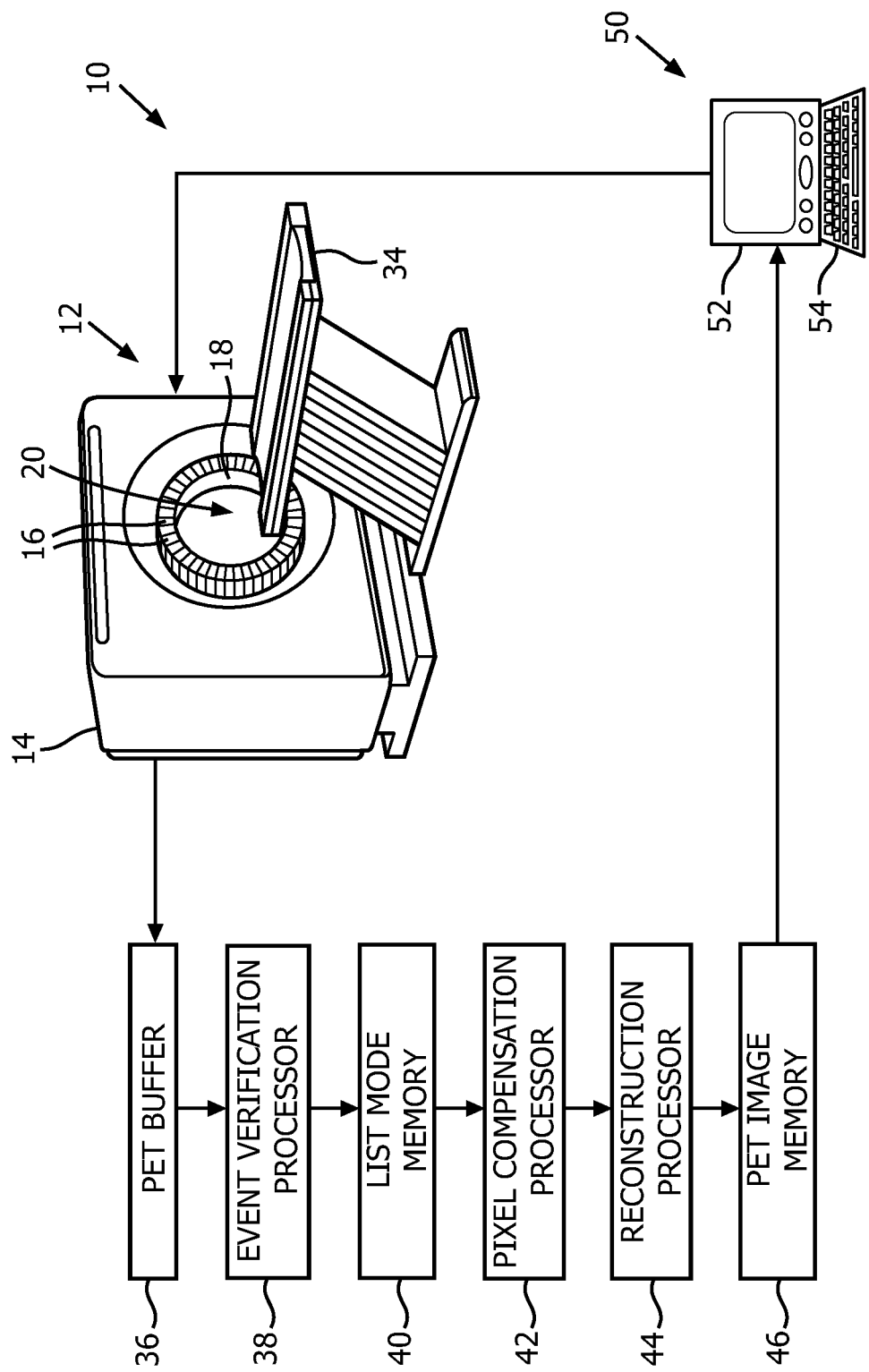
FIG. 2 illustrates a PET imaging system with a pixel compensation processor according to the present application.

With reference to FIG. 2, a PET imaging system 10 includes a PET scanner 12. The PET scanner 12 generates raw scan data and includes a stationary gantry 14 housing a plurality of gamma detectors 16 arranged around a bore 18 of the scanner 12. The bore 18 defines an examination volume 20 for receiving a target volume of a subject to be imaged, such as a brain, torso, or the like. The detectors 16 are typically arranged in one or more stationery rings which extend the length of the examination volume 20. However, rotatable heads are also contemplated. The detectors 16 detect gamma photons from the examination volume 20 and generate the raw scan data.

Figure 3:
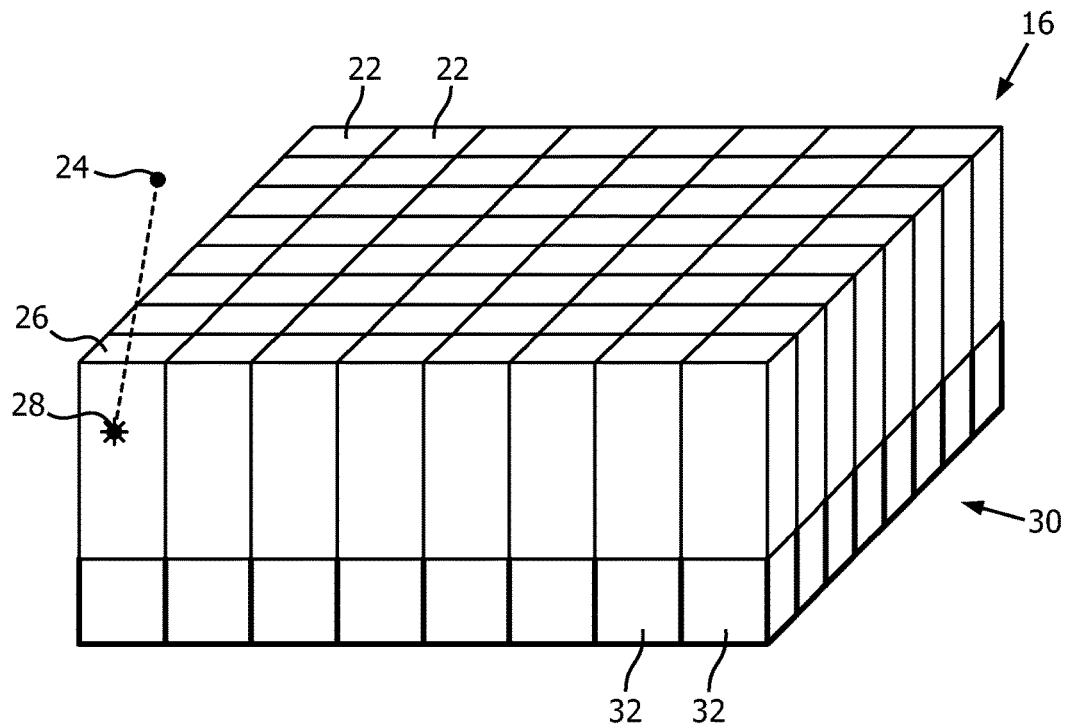
FIG. 3 illustrates a detector of the PET imaging system of FIG. 2.

With reference to FIG. 3, each of the detectors 16 includes one or more scintillators 22 arranged in a grid. The scintillators 22 scintillate and generate visible light pulses in response to energy depositions by gamma photons. As illustrated, a gamma photon 24 deposits energy in a scintillator 26, thereby resulting in a visible light pulse 28. The magnitude of a visible light pulse is proportional to the magnitude of the corresponding energy deposition. Examples of scintillators 22 include sodium iodide doped with thallium (NaI(Tl)), cerium-doped lutetium yttrium orthosilicate (LYSO) and cerium doped lutetium oxyorthosilicate (LSO).

In addition to the scintillators 22, the detectors 16 each includes a sensor 30 detecting the visible light pulses in the scintillators 22. The sensor 30 includes a plurality of light sensitive elements 32. The light sensitive elements 32 are arranged in a grid of like size as the grid of scintillators 22 and optically coupled to corresponding scintillators 22. The light sensitive elements 32 can be coupled to the scintillators 22 in a one-to-one arrangement, a one-to-many arrangement, a many-to-one arrangement, or any other arrangement. Typically, as illustrated, the light sensitive elements 32 are silicon photomultipliers (SiPMs), but photomultiplier tubes (PMTS) are also contemplated.

Where the light sensitive elements 32 are SiPMs, there is typically a one-to-one correspondence between the scintillators 22 and the light sensitive elements 32, as illustrated, but other correspondences are contemplated. Each of the SiPMs includes a photodiode array (e.g., Geiger-mode avalanche photodiode arrays), each photodiode corresponding to a cell of the photodiode array. Suitably, the SiPMs 32 are configured to operate in a Geiger mode to produce a series of unit pulses to operate in a digital mode. Alternatively, the SiPMs can be configured to operate in an analog mode. Where the light sensitive elements 32 are PMTs, there is often a many-to-one correspondence between the scintillators 22, but other correspondences are contemplated.

Referring back to FIG. 2, during a scan of a subject using the scanner 12, a target volume of the subject is injected with a radiopharmaceutical or radionuclide. The radiopharmaceutical or radionuclide causes gamma photons to be emitted from the target volume. The target volume is then positioned in the examination volume 20 using a subject support 34 corresponding to the scanner 12. Once the target volume is positioned within the examination volume 20, the scanner 12 is controlled to perform a scan of the target volume and event data is acquired. The acquired event data describes the time, location and energy of each scintillation event detected by the detectors 16 and is suitably stored in a PET data buffer 36.

The location of a scintillation event corresponds to a pixel of the scanner 12. A pixel is the smallest area to which a scintillation event can be localized. For example, suppose the light sensitive elements 32 are SiPMs and there is a one-to-one coupling between scintillators 22 and light sensitive elements 32. In such instances, the smallest area to which a scintillation event can be localized is typically a scintillator/SiPM pair, whereby a pixel typically corresponds to a scintillator/SiPM pair. As another example, suppose the light sensitive elements 32 are PMTs or SiPMs and there is a many-to-one coupling between scintillators 22 and light sensitive elements 32. In such instances, Anger logic is typically used to localize scintillation events to individual scintillators 22, whereby a pixel typically corresponds to a scintillator 22, but not a light sensitive element 32.

Subsequent to acquisition, or concurrently therewith, an event verification processor 38 filters the buffered event data. The filtering includes comparing energy (cell counts in the digital mode) of each scintillation event to an energy window, which defines the acceptable energy range for scintillation events. Those scintillation events falling outside the energy window are filtered out. Typically, the energy window is centered on the known energy of the gamma photons to be received from the examination volume 20 (e.g., 511 kiloelectron volt (keV)) and determined using the full width half max (FWHM) of an energy spectrum generated from a calibration phantom. The event verification processor 38 further generates lines of response (LORs) from the filtered event data. A LOR is defined by a pair of gamma photons striking the detectors 16 within a specified time difference of each other (i.e., a coincident event). The specified time difference is small enough to ensure the gammas are from the same annihilation event. Hence, assuming that there is a one-to-one correspondence between scintillation events and gamma photons striking the detectors 16, a LOR can be defined by a pair of scintillation events.

The foregoing filtering of event data and determining of LORs assumed that there was a one-to-one correspondence between scintillation events and gamma photons striking the detectors 16. However, those skilled in the art will appreciate that in practice, a gamma photon can yield multiple scintillation events. In some instances, before the event data is passed to the event verification processor 38, the scintillation events of the event data are combined based on gamma photon. For example, the energy of scintillation events belonging to a common gamma photon can be summed and the location with which the gamma photon struck the detectors 16 can be approximated. The event verification processor 38 then filters and determines LORs from the updated event data.

Data describing the coincident events, as or once determined by the event verification processor 38, is stored within a list mode memory 40 as a list, where each list item corresponds to a coincident event. The data for each of the list items describes the corresponding LOR by the spatial data (e.g., by the X and Z locations) for the two pixels to which the pair of gamma photons of the LOR are localized. Further, the data for each of the list items can optionally describe the energy of the two gamma photons of the corresponding coincident event, and/or either the times stamps of the two gamma photons or the difference between the times stamps of the two gamma photons.

A pixel compensation processor 42 receives the list mode data, as it is being generated or once it's generated, and fills in missing event data for dead pixels by using event data from other pixels. A dead pixel is a pixel missing valid data. Dead pixels may arise due to problems in one or more of scintillator performance, optical coupling between light sensitive elements 32 and scintillators 22, light sensitive elements 32, and processing electronics. Because PET scanners acquire three-dimensional (3D) data, a simple flood and/or uniformity correction cannot be performed at the detectors 16, as is done in single-photon emission computed tomography (SPECT) and computed tomography (CT). PET requires the missing pixel pair to be generated. Any approach can be employed to fill in data missing for dead pixels, but two approaches use first order approximation and sinogram space interpolation, respectively.

According to the first order approximation approach, the list mode data is directly used. As noted above, the list mode data contains a list item for each detected coincident event. Compensation for each dead pixel is performed by, for each list item corresponding to a neighboring pixel, determining whether the list item meets selection criteria and, if so, both duplicating the list item and replacing the location of the neighboring pixel with the location of the dead pixel in the duplicate list item. A neighboring pixel is typically any pixel immediately adjacent to the dead pixel, but different criteria can be employed to define what a neighboring pixel is. For example, a neighboring pixel can be any pixel sharing a detector ring with the dead pixel, and/or being immediately adjacent to the dead pixel or within a predetermined number of pixels (e.g., 2 pixels) of the dead pixel.

As noted above, a list item is processed only if selection criteria are met. No specific selection criteria need to be employed. In a simple case, all list items are selected. In more complicated cases, a list item is probabilistically selected. For example, each neighboring pixel is associated with a probability of an event being relevant to the dead pixel. The probability can be based on the distance of the neighboring pixel to the dead pixel and/or whether the neighboring pixel is on the same detector ring as the dead pixel. For example, the probability can be lower the farther away the neighboring pixel is from the dead pixel and/or lower when the neighboring pixel is on a different detector ring as the dead pixel. When a list item corresponding to a neighboring pixel is encountered, a random number is determined. If the probability of the determined random number is less than or equal to the probability of the neighboring pixel, the list item is selected.

According to the sinogram space interpolation approach, the list mode data is converted to sinograms, one for each slice. This conversion can alternatively be performed by another component of the system 10, whereby the pixel compensation processor 42 receives sinogram data instead of list mode data. Typically, the sinograms are generated from true, scatter and random coincident events (collectively referred to as prompt coincident events), but the sinograms can be generated from any combination of true, scatter and random coincident events. For example, the sinograms can be generated from true and random coincident events.

The sinogram space is sometimes referred to as the LOR space since each position signifies the pair of pixels that measured a coincident event. While sinograms typically only provide the spatial connectivity data for pixels, sinograms can be extended to include time-of-flight (ToF) data describing the ToF values for each coincident data. The ToF value for a coincident event is the difference in time measurements between the pair of pixels detecting the coincident event. To extend sinograms to include ToF data, each sinogram (corresponding to a slice) is divided into frames, one for each of a plurality of ToF bins. The ToF bins collectively span the range of possible ToF values for the scanner 12, with each individual ToF bin spanning a subrange corresponding to the ToF precision of the scanner 12. For example, a typical scanner has a ToF precision of about 25 picoseconds (ps), whereby each of the ToF bins typically spans a 25 ps range. Further, a typical scanner has +/−2.5 nanosecond (ns) range of ToF values, where a typical sinogram includes 201 frames.

Using the sinograms, values for each discreet location (i.e., positions) in the sinograms that are associated with dead pixels are interpolated (i.e., estimated) from neighboring positions. Where the sinograms include ToF data, a position is specific to a frame. As those skilled in the art will appreciate, a dead pixel manifests as a diagonal line of missing data in a sinogram. A neighboring position is typically any position immediately adjacent to the position being estimated, but different criteria can be employed to define what a neighboring position. Neighboring positions of a position being estimated can span across sinograms and/or, where ToF data is included, frames. Alternatively, neighboring positions of a position being estimated can be limited to the same sinogram or, where ToF data is included, the same frame.

Advantageously, by using sinograms, the interpolation can include data modeling to fit the known data and to estimate missing pixel data. The interpolation can be performed using any suitable interpolation technique. For example, the interpolation can be performed using the well-known nearest neighbor interpolation technique. As another example, more complicated techniques, such as the well-known bilinear interpolation technique or pattern matching techniques, can be employed. The bilinear interpolation technique performs a weighting of neighbor values, and pattern matching techniques examines the shape of the sine waves within the sinograms. Asymmetrical weighting may be performed for edge pixels of detectors that generally have lower collection efficiency due to Compton (i.e., scatter) events not being collected as efficiently as center pixels of detectors.

As should be appreciated, the sinogram space interpolation approach is much more computationally intensive than the first order approximation approach. Whereas the first order approximation approach can be performed while the list mode data is being generated, the sinogram space interpolation approach can only be performed once the list mode data is generated. The sinogram space interpolation approach uses the final values for neighboring pixels to estimate the value for dead pixels.

Figure 1:
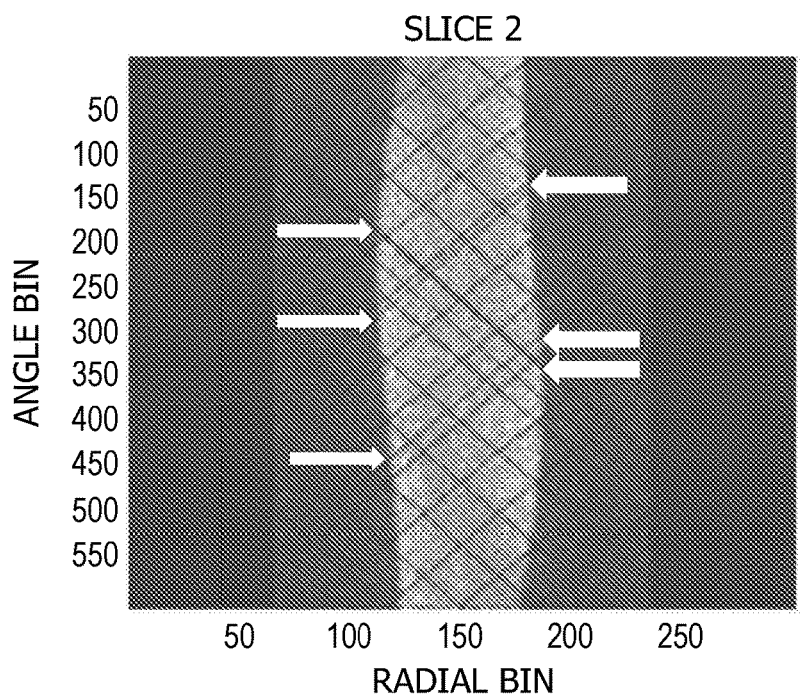
FIG. 1 illustrates a prior art sinogram generated using a positron emission tomography (PET) imaging system with dead pixels.
Figure 4:
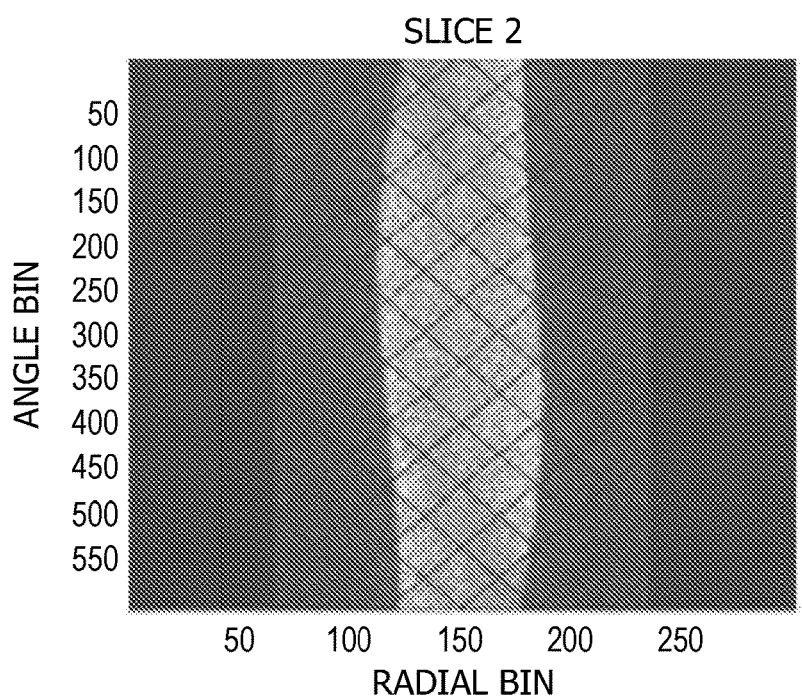
FIG. 4 illustrates a sinogram generated from the same data as the sinogram of FIG. 1 and using pixel compensation according to the present application.

Referring to FIG. 4, a sinogram compensated for three dead pixels is provided. The sinogram was generated from the same data used to generate the sinogram of FIG. 1. The data for the dead pixels was approximated using the sinogram space interpolation approach. As can be seen, through comparison with the sinogram of FIG. 1, the compensated sinogram provides cleaner data for reconstruction that eliminates artifacts in the reconstructed image. Notably, the areas of missing data, demarcated by the arrows of FIG. 1, have been filled with data.

Referring back to FIG. 2, a PET reconstruction processor 44 reconstructs the corrected list mode data and/or sinogram data from the pixel compensation processor 42 into a final, reconstructed image of the target volume. The reconstructed image is typically stored in a PET image memory 46. To generate the reconstructed image, any suitable reconstruction algorithm can be employed. For example, an iterative-based reconstruction algorithm can be employed.

A control system 48, such as a computer, provides a graphical user interface (GUI) to users of the system. The GUI makes use of a display device 50 and a user input device 52 to allow the users to interact with the control system 48. By way of the GUI, the control system 48 can be employed to control the scanner 12 to image a subject. For example, the user can coordinate a PET image of a target volume of the subject. Further, by way of the GUI, the control system 48 can be employed to view and, optionally, manipulate images stored in the image memory 46. For example, an image of the image memory can be displayed on the display device 50.

In some instances, one or more of the data buffer 36, the event verification processor 38, the list mode memory 40, the pixel compensation processor 42, the reconstruction processor 44, and the image memory 46 are integrated with the control system 48. For example, the reconstruction processor 44, the pixel compensation processor 42, and the event verification processor 38 can share a common processor of the control system 48. In such instances, the reconstruction processor 44, the pixel compensation processor 42, and the event verification processor 38 are typically implemented as software modules. The software modules are stored on a memory of the control system and executed by a processor of the control system.

Figure 5:
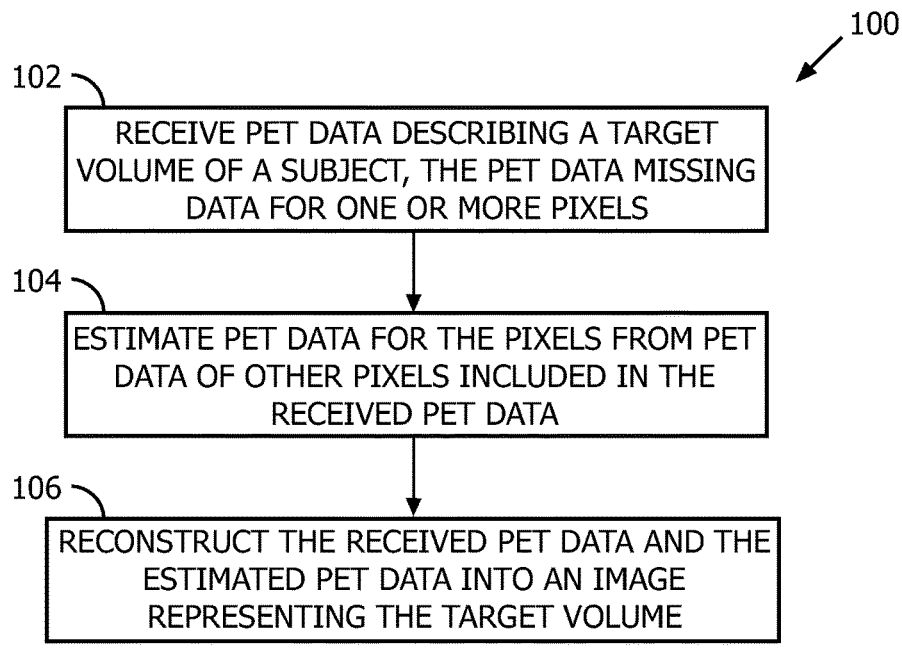
FIG. 5 illustrates a method of compensating for dead pixels in PET imaging.

With reference to FIG. 5, a method 100 for compensating for dead pixels in a PET imaging is provided. The method 100 is suitably performed by one or more processors 42, 44. In that regard, the method 100 is typically embodied by processor executable instructions stored on a memory and executed by the processors 42, 44.

According to the method 100, PET data describing a target volume of a subject and generated by a PET scanner 12 is received 102. The PET data is missing data for one or more pixels of the scanner 12. These so called dead pixels may arise due to problems in one or more of scintillator performance, optical coupling between light sensitive elements and scintillators, light sensitive elements, and processing electronics. Examples of the light sensitive elements include SiPMs and PMTs. Using the received PET data, PET data is estimated 104 for the dead pixels. In contrast with SPECT, PET data is three dimensional (3D). Hence, the process of estimating PET data is more involved than in SPECT.

In some instances, the received PET data is list mode data, each list item corresponding to a coincident event. In such instances, one approach to estimating the PET data for the dead pixel includes duplicating list items associated with neighboring pixels. The locations of the neighboring pixels in the duplicate PET data are then replaced with the location of the dead pixel. While all the list items associated with neighboring pixels can be employed, the list items can also be intelligently selected. For example, list items associated with neighboring pixels can be probabilistically selected. In some instances, the received PET data is sinogram data, optionally including ToF data. In such instances, one approach to estimating the PET data for a dead pixel includes interpolating a value for each discreet location in the sinogram domain that is associated with the dead pixel from the values of neighboring locations. For example, nearest neighbor interpolation can be performed.

Once data is estimated for the dead pixels, the combination of the received data and the estimated data is reconstructed 106 into an image representing the target volume. To generate the reconstructed image, any suitable reconstruction algorithm can be employed. For example, an iterative-based reconstruction algorithm can be employed.

As used herein, a memory includes any device or system storing data, such as a random access memory (RAM) or a read-only memory (ROM). Further, as used herein, a processor includes any device or system processing input device to produce output data, such as a microprocessor, a microcontroller, a graphic processing unit (GPU), an application-specific integrated circuit (ASIC), an field-programmable gate array (FPGA), and the like; a controller includes any device or system controlling another device or system, and typically includes at least one processor; a user input device includes any device, such as a mouse or keyboard, allowing a user of the user input device to provide input to another device or system; and a display device includes any device for displaying data, such as a liquid crystal display (LCD) or a light emitting diode (LED) display.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A system for compensating for one or more dead pixels in positron emission tomography (PET) imaging, said system comprising:
   a pixel compensation processor configured to:
      receive PET data describing a target volume of a subject, the PET data missing data for one or more dead pixels, wherein the received PET data is one of:
         coincident event pairs in the list mode, or
         a sinogram data generated from coincident events; and
      estimate PET data for the dead pixels from the received PET data.

2. The system according to claim 1, wherein a pixel is the smallest area to which a scintillation event can be localized.

3. The system according to claim 1, wherein the received PET data is list mode data, each list item describing a coincident event pair.

4. The system according to claim 1, wherein the pixel compensation processor is configured to estimate the PET data for one of the dead pixels by:
   probabilistically selecting subsets of PET data of pixels neighboring the dead pixel and included in the received PET data;
   duplicating or weightedly combining the selected subsets of PET data; and
   replacing locations of the neighboring pixels with a location of the dead pixel in the duplicate or weightedly combined PET data.

5. The system according to claim 1, wherein the received PET data is sinogram data, and wherein the pixel compensation processor is configured to estimate the PET data for the dead pixels in a sinogram domain.

6. The system according to claim 5, wherein the sinogram domain includes a dimension for time-of-flight (ToF).

7. The system according to claim 1, wherein the pixel compensation processor is configured to estimate the PET data for one of the dead pixels by:
   interpolating a value in the sinogram domain that is associated with the dead pixel.

8. The system according to claim 1, further including:
a reconstruction processor which reconstructs the received PET data and the estimated PET data into an image representation of the target volume.

9. A method for compensating for one or more dead detector pixels in positron emission tomography (PET) imaging, said method comprising:
receiving PET data describing radiation events from a target volume of a subject received by detector pixels, the PET data missing data for one or more dead detector pixel;
identifying pairs of coincidently received radiation events, each coincident event pair defining a line of response (LOR), wherein LORs that would be defined using a dead detector pixel are missing;
estimating LORs corresponding to the dead pixels from the received PET data; and
reconstructing the LORs and the estimated LORs into a PET image.

10. The method according to claim 9, wherein the received PET data is list mode data describing a coincident event pair at each list item.

11. The method according to claim 9, wherein the estimating includes:
probabilistically selecting subsets of PET data of pixels neighboring one of the dead pixels and included in the received PET data;
duplicating or weightedly combining the selected subsets of PET data; and
replacing locations of the neighboring pixels with a location of the dead pixel in the duplicate PET data.

12. The method according to claim 9, wherein the received PET data is sinogram data, and wherein the method further including:
converting the PET data to sinograms in a sinogram domain; and
estimating the PET data corresponding to dead pixels in the sinogram domain.

13. The method according to claim 12, where the sinogram domain includes an additional dimension for time-of-flight (ToF).

14. The method according to claim 12, wherein the estimating includes:
interpolating a value for each discreet location in the sinogram domain that is associated with the dead pixels from the values of neighboring locations.

15. At least one processor programmed to perform the method according to claim 9.

16. A system for compensating for one or more dead pixels in positron emission tomography (PET) imaging, said system comprising:
a plurality of silicon photomultipliers (SiPMs) whichreceive gamma radiation events from a target volume of a subject and generate PET data;
a pixel compensation processor configured to:
receive the PET data from the SiPMs, the PET data missing data for a dead pixel associated with a non-functioning SiPM;
identify pairs of gamma radiation events received coincidently by the SiPMs, each coincident pair of events defining a measured line of response (LOR);
convert the coincident pairs to sinograms in sinogram space, each position in sinogram space signifying one coincident pair, each dead pixel manifesting as a line of missing data in sinogram space;
based on the lines of missing data, generate estimated LORs for the missing data in sinogram space; and
reconstruct the measured and estimated LORs into a PET image.

17. The system according to claim 16, wherein the PET data includes measured time-of-flight data, and wherein the pixel compensation processor is further configured to:
sort times-of-flight measurements between coincident pairs into bins, the times-of-flight being depicted by an additional dimension in sinogram space;
divide the sinograms into frames, each frame corresponding to one of the bins;
generate estimated LORs and times-of-flight, the measured and estimated LORs and times-of-flight being reconstructed into the PET image.

* * * * *